(12) United States Patent
Wang et al.

(10) Patent No.: US 7,011,285 B2
(45) Date of Patent: Mar. 14, 2006

(54) MODULAR STAND STRUCTURE

(75) Inventors: Shih-Hsuan Wang, Taipei (TW);
Yu-Chi Lin, Taipei (TW)

(73) Assignee: Inventec Corporation, Taipei (TW)

( * ) Notice: Subject to any disclaimer, the term of this patent is extended or adjusted under 35 U.S.C. 154(b) by 186 days.

(21) Appl. No.: 10/610,580

(22) Filed: Jul. 2, 2003

(65) Prior Publication Data
US 2005/0001138 A1    Jan. 6, 2005

(51) Int. Cl.
*F16M 1/00* (2006.01)
(52) U.S. Cl. .................................. 248/673; 248/677
(58) Field of Classification Search .............. 248/688, 248/121, 126, 371, 676, 677, 685
See application file for complete search history.

(56) References Cited

U.S. PATENT DOCUMENTS

| | | | | |
|---|---|---|---|---|
| 4,601,561 A | * | 7/1986 | Yamashita | 396/178 |
| 5,141,196 A | * | 8/1992 | Arnold et al. | 248/397 |
| 5,640,301 A | * | 6/1997 | Roecker et al. | 361/686 |
| 6,386,502 B1 | * | 5/2002 | Yamagishi | 248/685 |

* cited by examiner

*Primary Examiner*—Gwendolyn Baxter
(74) *Attorney, Agent, or Firm*—Bacon & Thomas, PLLC

(57) ABSTRACT

The present invention is to provide a modular stand structure being applied to the back panel of a portable electronic device, which comprises a first board and a cover disposed on a second board. The top of one surface of the first board has a movable button, such that when the movable button is pushed forward, it moves a sliding member and an another sliding member located in the first board towards both sides such that a stand on the other side of the first board will be detached from its embedding latch due to the sliding of those sliding members, while the outward force produced by a spring at one end of a support rod drives two longitudinal grooves disposed on another side of the first board to slide downward to a fixed position in order to constitute a stable supporting angle and give better viewing angle and better operating angle for the portable electronic device.

7 Claims, 5 Drawing Sheets

MODULAR STAND STRUCTURE

BACKGROUND OF THE INVENTION

1. Field of the Invention

The present invention relates to a stand modular structure, more particularly to a modular stand structure for supporting a display panel of an electronic device to provide users a good viewing and an operating angle.

2. Description of the Related Art

In general, a portable electronic device (such as a notebook computer, a PDA, and plat panel computer) features the portablility as its name suggests. Unlike desktop computers having a large volume for the whole set of equipment and occupying lot of space; if the portable electronic device is a notebook computer, then it has a main system, a keyboard installed on the main system, and a display screen pivotally coupled to the rear side of the main system by a hinge such that users can lift up or close the display monitor from/to the main system; if the portable device is a plat panel computer, it has a main system, a display screen embedded into a surface of the main system, and at least one communication cable connected between the display screen and the main system for the signal connection, so that users can enter information to the main system by a plurality of function keys on the main system, and such information is sent to the display screen through these communication lines, and the related content of the information will be displayed on the display screen.

However, the display screen of the flat panel computer can be attached flatly onto the main system. In other words, the included angle between the main system and the display screen is zero, and users are unable to adjust the viewing angle and height, and thus causing inconvenience in the application and giving many limitations. For notebook computers, although the display screen can be lifted up from the main system by means of a hinge to give better viewing for users, its keyboard is set on the main system, therefore its application is incomparable with the desktop computer that provides a detachable keyboard and a monitor and allows adjustment or heightening of the monitor. Such configuration goes into a direction opposite to the development trend of the present portable electronic devices.

To solve the problem of erecting the foregoing portable electronic device, the traditional electronic designers and manufacturers generally uses a stand with simple structure disposed directly at the back panel of the flat panel computer (such stand is not observed at the back panel of notebook computers yet). However, the strength of the traditional stand is not strong and stable enough, and its structure is too rough that easily causes the stand to fall or incline after the flat panel computer erects.

Therefore, unlike the traditional ones, a modular stand structure can be applied to notebook computers or flat panel computers to improve the erecting problem, so that such stand can have the features of an electronic portable device without the shortcoming of occupying a large volume and space while maintaining the convenience of the traditional desktop computer. Such arrangement can improve the utility of the electronic device, and also can meet the severe competition in the information market; it is definitely a big improvement and breakthrough as well as a benefit to our society.

SUMMARY OF THE INVENTION

The primary objective of the present invention is to provide a modular stand structure that can be applied to the back panel of a portable electronic device (such as a notebook computer and a flat panel computer, etc). Such stand module comprises a first board and a cover disposed on a second board, and the top of one surface of the first board has a movable button, such that when the movable button is pushed forward, it moves a sliding member and an another sliding member located in the first board towards both sides such that a stand on the other side of the first board will be detached from its embedding latch due to the sliding of those sliding members, while the outward force produced by a spring at one end of a support rod drives two longitudinal grooves disposed on another side of the first board to slide downward to a fixed position in order to constitute a stable supporting angle and give better viewing angle and better operating angle for the portable electronic device.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
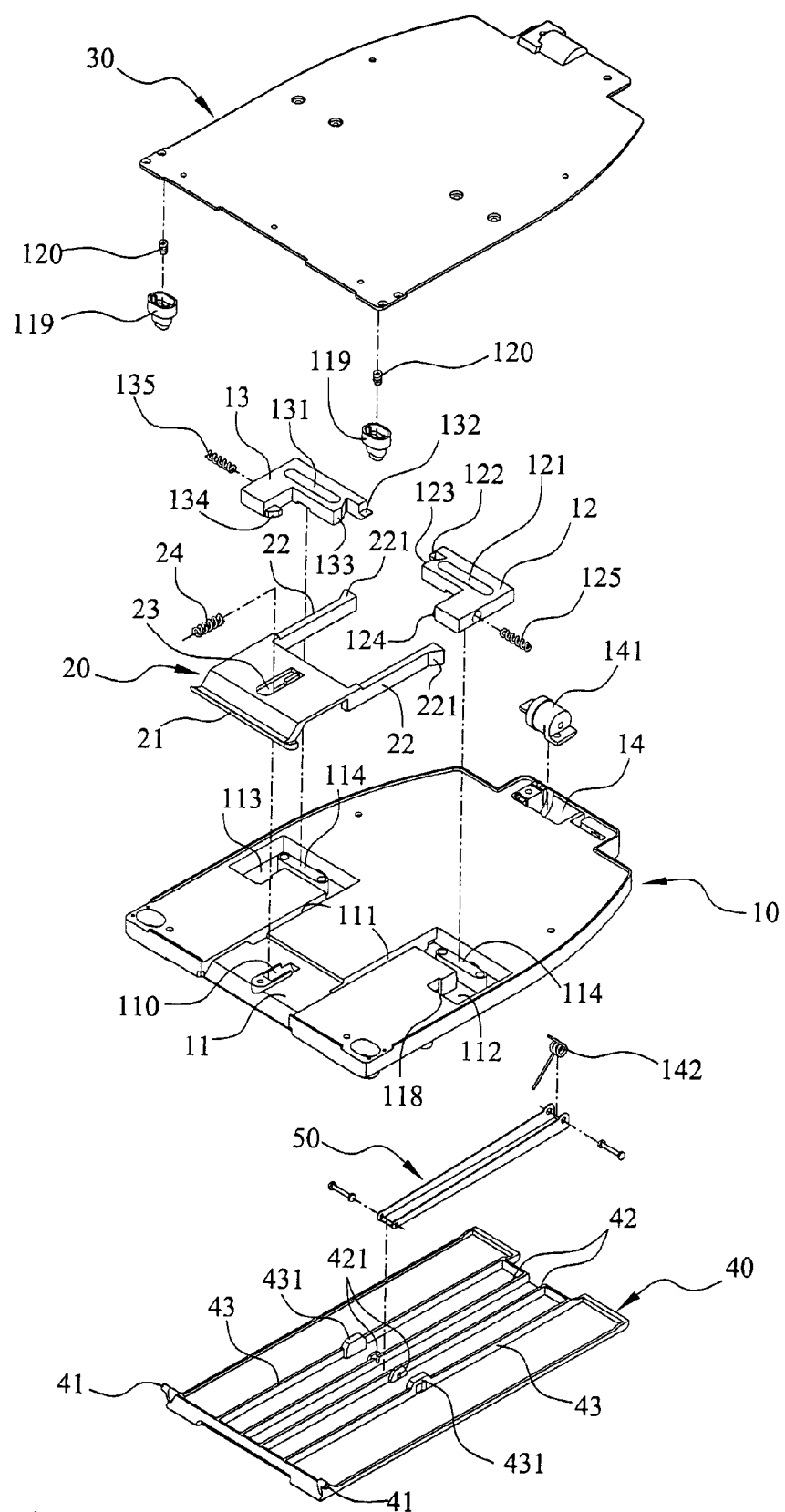
FIG. 1 is a perspective diagram of the disassembled parts of the modular stand structure of the present invention.

Refer to FIG. 1 for the "Modular stand structure" of the present invention, which can be applied to any portable electronic device (such as a notebook computer and a flat panel computer, etc.). Such modular stand comprises a first board 10, a movable button 20, a second board 30, and a stand 40. In FIG. 1, the first board 10 at its top on one side proximate the middle has a U-shaped accommodating groove 11, and a groove 111 respectively extended downward for a distance along the two corresponding sides at the bottom of the accommodating groove 11 and a corresponding L-shaped groove hole 112 and another groove hole 113 respectively penetrating the bottom of the two grooves 111, and a protruded pillar 114 disposed in the horizontal space of the groove hole 112 and another groove hole 113.

Figure 2:
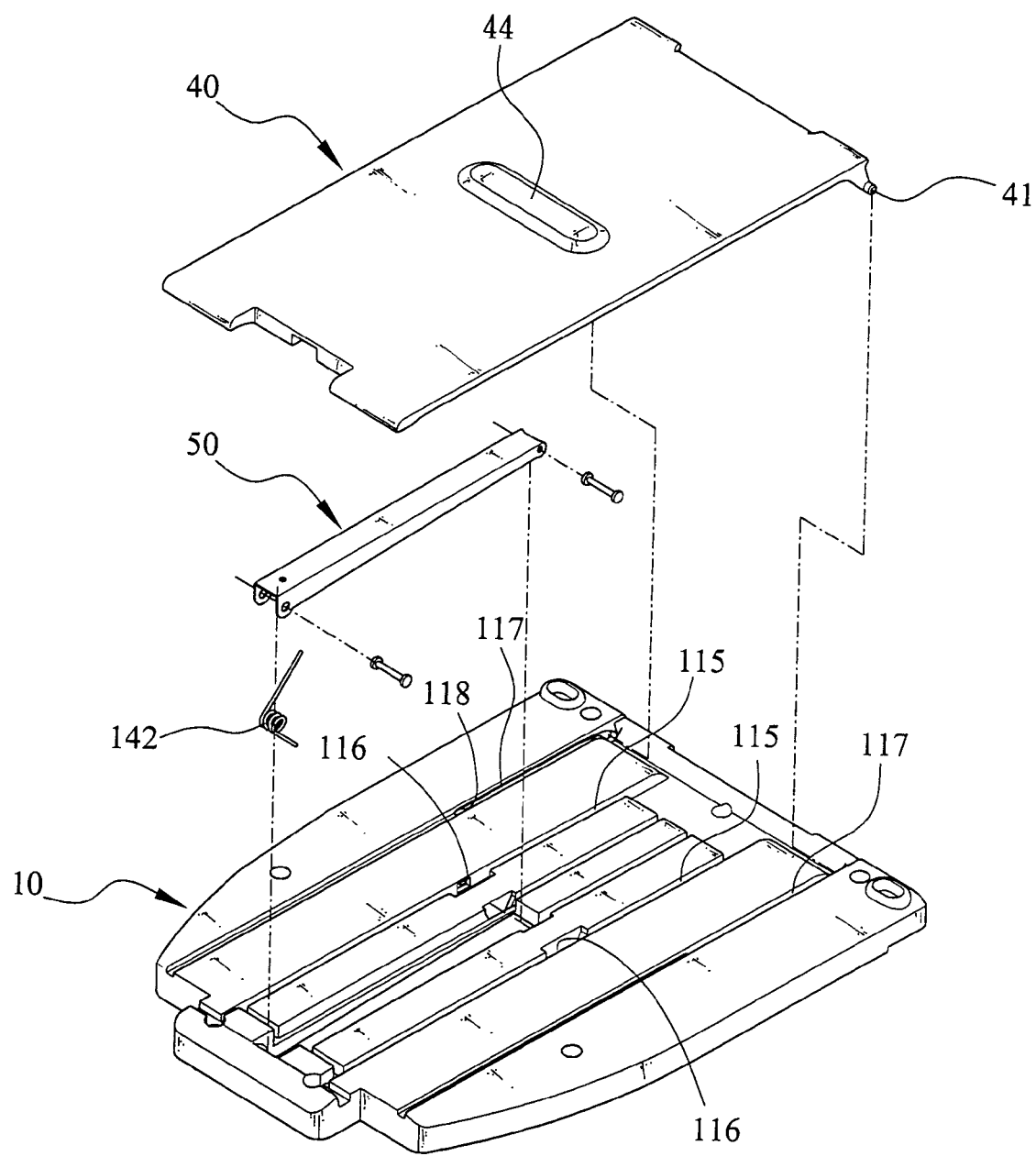
FIG. 2 is another perspective diagram of the disassembled parts of the modular stand structure of the present invention.

Please refer to FIG. 2. A pair of corresponding first longitudinal sliding grooves 115 and a pair of corresponding second longitudinal sliding grooves 117 are disposed on the other side of the first board 10, and a predetermined gap is maintained between the first longitudinal sliding grooves 115 and the second longitudinal sliding grooves 117, wherein the two first longitudinal sliding grooves 115 at the position corresponding to the bottom of the two grooves 111 (as shown in FIG. 1) each has a penetrating hole 116 (as shown in FIG. 2), and the pair of second longitudinal sliding grooves 117 respectively have another penetrating hole 118 corresponding to the position of the vertical space of a side wall of the groove hole 112 and another groove hole 113 (as shown in FIGS. 1 and 2).

Figure 3:
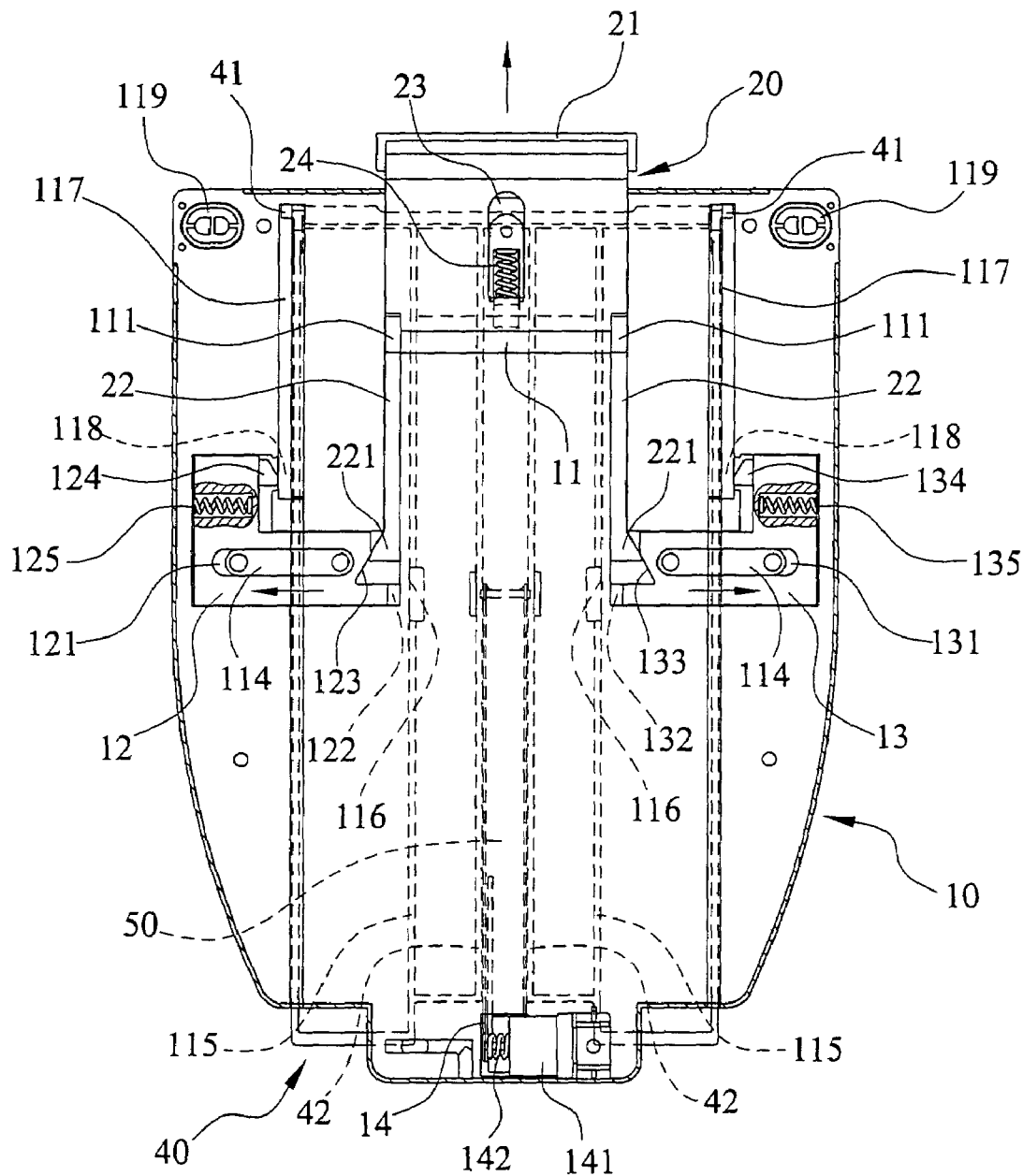
FIG. 3 is an illustrative diagram of the assembling movement of the modular stand structure of the present invention.

In FIG. 1, a movable button 20 being substantially in the shape of a square comprises a flange 21 at its top; two corresponding sides at its bottom; two rod bodies 22 extended to a distance downward; a pair of hooks 221 in respectively disposed in a mutually opposite direction to each other at the bottom of the two rod bodies 22, so that the movable button 20 can be accommodated in the accommodating groove 11 of the first plate body 10 and the flange 21 at the upper section can protrude outside (as shown in FIG. 3) such that the two rod bodies 22 can be accommodated exactly into the two grooves 111.

In FIG. 1, a L-shaped sliding member 12 and another sliding member 13 are respectively disposed in the space of the groove hole 112 and another groove hole 113, and these sliding members 12, 13 respectively comprise a hole 121, 131 at their horizontal main body, such that these holes 121, 131 can be sleeved onto a protruded pillar 114 of the groove hole 112 and another groove hole 113 and slid horizontally (as shown in FIG. 3). A first embedding member 122, 132 respectively disposed on the main body of the sliding member 12 and another sliding member 13 has a first embedding member 122, 132, and the first embedding members can be exposed in the penetrating holes 116 of the two first longitudinal sliding grooves 115 (as shown in FIGS. 2 and 3) and at the position proximate the first embedding member 122, 132. An embedding section 123, 133 mutually engaged to a hook 221 of the rod body 22.

Further, a first second embedding member 124, 134 is disposed respectively on a sidewall of the vertical main body of a sliding member 12 and another sliding member 13. The second embedding member 124, 134 can be exposed in another penetrating hole 118 of the second longitudinal sliding groove 117 (as shown in FIGS. 2 and 3), and another sidewall of the vertical main body of a sliding member 12 and another sliding member 13 respectively props up against the inner wall of the groove hole 112 and another groove hole 113 by a first spring 125, 135 (as shown in FIGS. 1 and 3), such that after the sliding member 12 and another sliding member 13 are slid horizontally, they can resume their original positions quickly. Furthermore, a bottom surface of the first board 10 proximate the middle has another accommodating groove 14, and a damper 141 and a second spring 142 (as shown in FIGS. 1 and 3) are disposed in another accommodating groove 14. In the meantime, the size of the two boards 30 substantially allows the cover to be mounted onto a surface of the first board 10.

In FIG. 1, a latch hook 41 is disposed respectively on both sides of a top surface of the stand 40, which can be slid in the two longitudinal sliding grooves 117 of another surface of the first board 10 (as shown in FIG. 2). Further, a pair first corresponding longitudinal ribs 42 and a pair of second longitudinal ribs 43 are respectively disposed on the surface of the stand 40; a predetermined gap is kept between the adjacent first pair of longitudinal ribs 42 and the adjacent second pair of longitudinal ribs 43; a pivotal connecting section 421 is disposed in the middle between two adjacent first longitudinal ribs 42, and an embedded groove 431 is disposed in the middle between two adjacent second longitudinal ribs 43.

Figure 4:
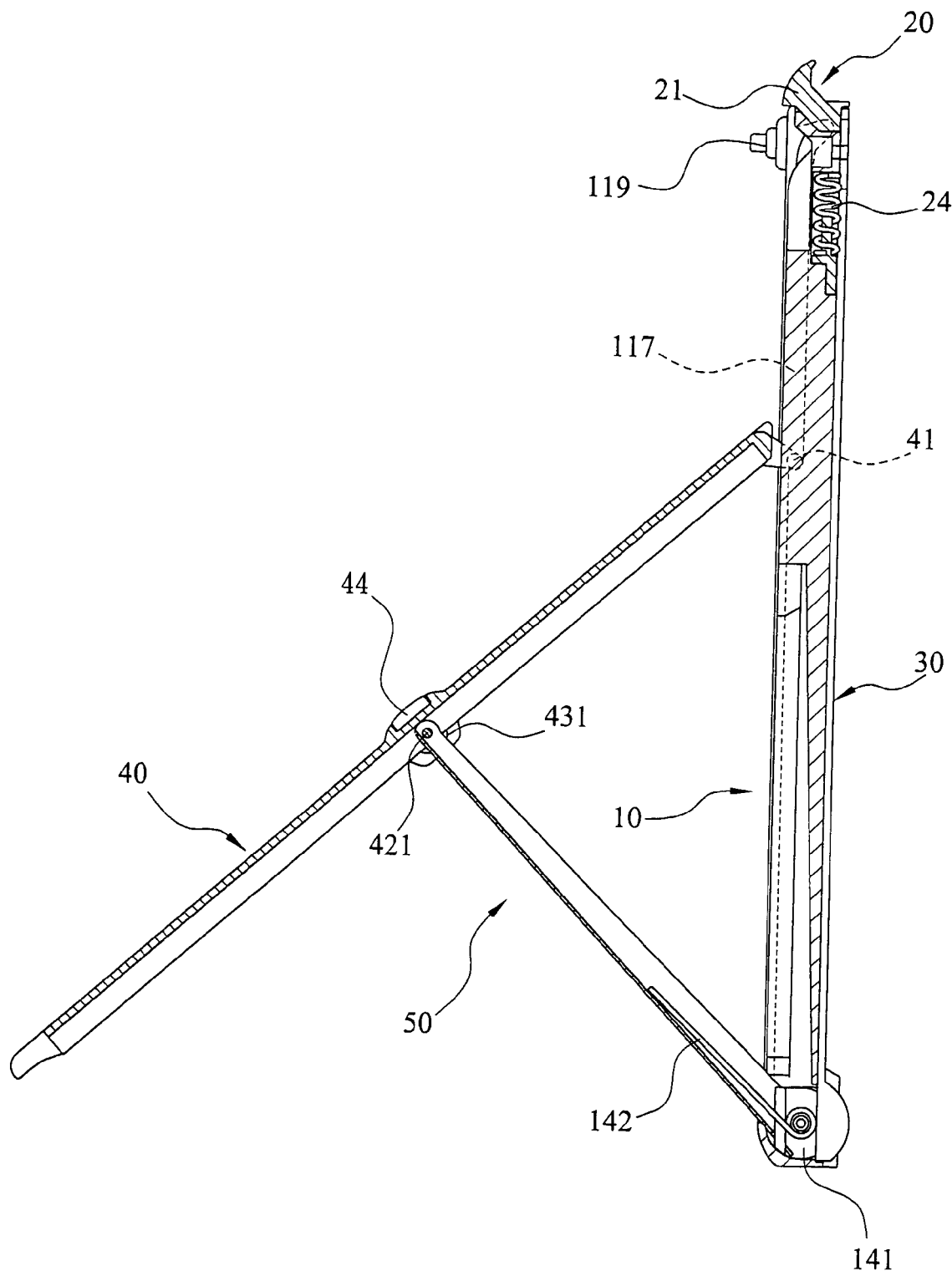
FIG. 4 is another illustrative diagram of the assembling movement of the modular stand structure of the present invention.

The present invention further comprises a support rod 50 (as shown in FIG. 1), having one end coupled to the pivotal connecting section 421 of the stand 40 and the other end coupled to a damper 141 in an accommodating groove 14 of the first board 10, and pressed by the second spring 142 (as shown in FIGS. 2, 3, and 4).

From the foregoing structure, it is clear that when the stand 40 flatly attaches onto another surface of the first board 10 (as shown in FIG. 3), the support rod 50 is folded between the two first longitudinal ribs 42 of the stand 40 and another surface of the first board 10. The first embedded member 122, 132 of the sliding member 12 and another sliding member 13 respectively passes through the penetrating hole 116 of the two first longitudinal sliding groove 115 in order to be embedded into the two embedded grooves 431 of the stand 40.

Figure 5:
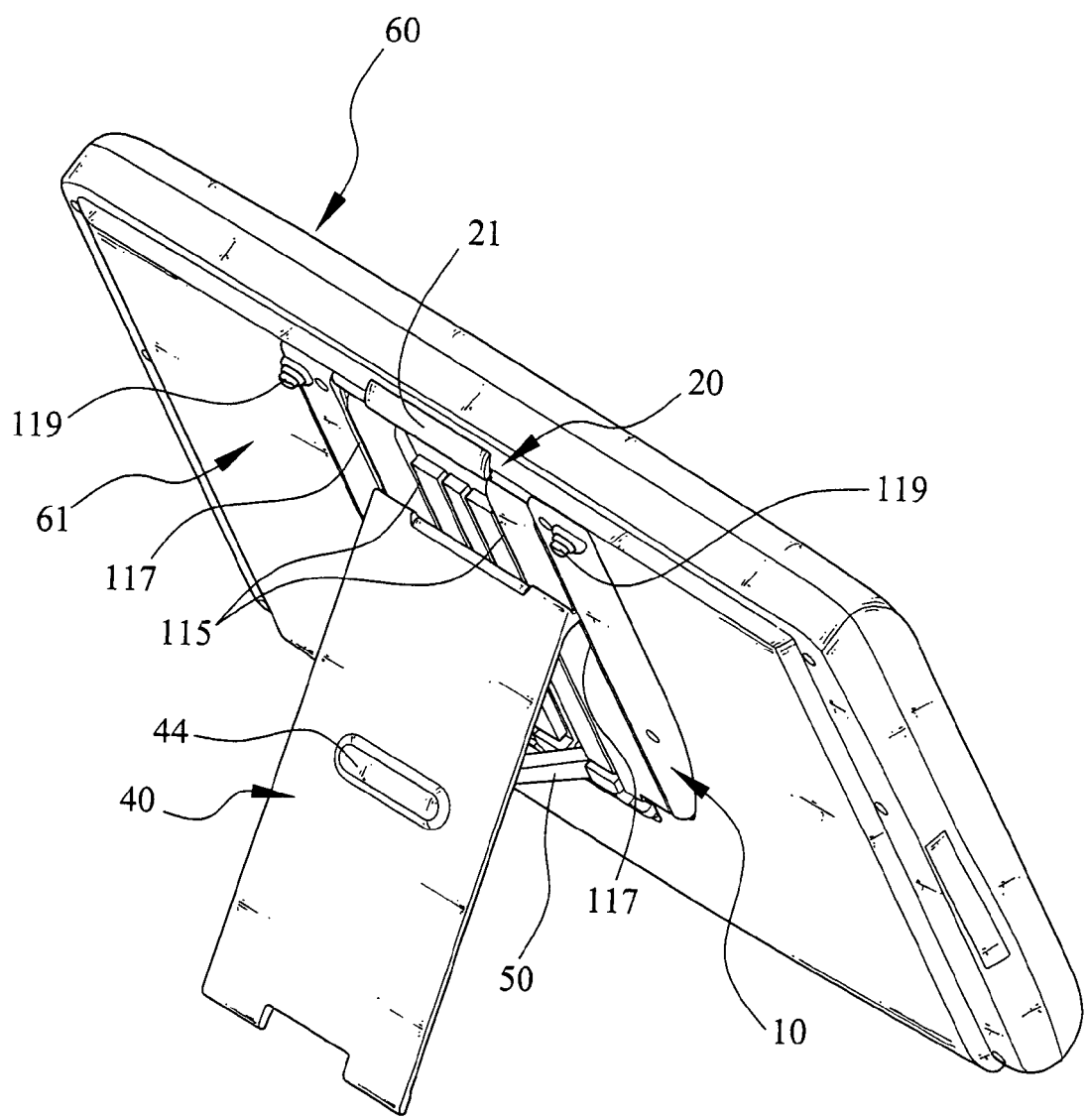
FIG. 5 is an illustrative diagram of a preferred embodiment of the present invention.

Please refer to FIG. 5. The foregoing modular stand can be applied to a back panel 61 of a notebook computer 60. When a flange 21 of the movable button 20 is pulled out by a hand, the flange 21 will be embedded into a hook 221 of the embedding section 123, 133 of the sliding member 12 and another sliding member 13, and in turn will drive and press against the sliding member 12 and another member 13 to slide sideway (as shown in FIG. 3), so that the first embedded member 122, 132 will separate from the two embedded grooves 431. At that time, the second spring 142 will in turn prop another end of the support rod 50 out (as shown in FIG. 4), so that the stand 40 produces a pushing force to push the two hooks 41 along the two longitudinal sliding grooves 117 and slide down to the second embedded member 124, 134. By means of the damper 141, it can prevent the speed of sliding down from going too fast or produce noises. When the pull-down force is eliminated, the sliding member 12 and another sliding member 13 will be pressed by the first spring 125, 135 to resume its original position quickly. In the meantime, the second embedded members 124, 134 will fix the two hooks 41 of the stand 40 into a position.

When a user wants to store the stand 40, the user can pull the flange 21 of the movable button 20 outward by a hand, while pushing the notebook 60 backward to separate the connection of two hooks 41 of the stand 40 from the two embedded members 124, 134, such that the two hooks 41 will then slide to the top along the second longitudinal sliding groove 117, while pressing a second spring 142 at another end of the support rod 50 to retreat to the original position, and return to the original position of flatly attaching onto another surface of the first board 10, and embedding the sliding member 12 and another sliding member 13 of the first embedded member 122, 132 into the two embedded grooves 431 of the stand 40.

Further, refer to FIGS. 1, 4, and 5. In order to store the stand 40 into a fixed position, and securely embed the first embedding member 122, 132 into the two embedding grooves 431 of the stand 40, a contractible pad 119 is disposed on each of the both sides of another top of the first board 10. The two contractible pads 119 respectively have a third spring 120 (as shown in FIG. 1), so that when the stand 40 is stored and the notebook computer 60 is pushed back and laid on the desktop, the stand 40 is secured by the elastic compression of the third spring 120 in the contractible pads 119, and pressing on the desktop by a protruded pad 44 disposed on another surface of the stand 40 (as shown in FIGS. 2, 4, and 5).

Further, the movable button 20 may have a rectangular hole 23 on its square structure and a concave hole 110 at he accommodating groove 11 of the first board 10, and a fourth spring 24 is disposed between the rectangular hole 23 and the concave hole 110, such that the fourth spring 24 can strengthen the automatic recovery movement of the movable button 20.

Furthermore, the modular stand of the present invention is made of aluminum alloy, and thus having the advantages of small volume, sufficient strength, and high reliability and enabling portable electronic device to have better displaying angle and operating angle. Unquestionably, this invention is a big contribution to the consumers.

While the present invention has been described by the most practical and preferred embodiments, it is understood that this invention is not limited to the disclosed embodiments but is intended to cover various arrangements included within the spirit and scope of the broadest interpretations and equivalent arrangements.

What is claimed is:

1. A modular stand structure, being used on a back panel of a portable electronic device, comprising:
    a first board having a top surface and a bottom surface, having an accommodating groove at the top surface, and a first groove hole and a second groove hole respectively disposed at a predetermined distance extended from two sides of the bottom of said accommodating groove, and another accommodating groove being disposed at the bottom surface, and a pair of first longitudinal sliding grooves respectively disposed on the other surface of the first board, and a predetermined gap being maintained between said longitudinal sliding grooves;
    a movable button, having a flange at the top, and two rod bodies being extended downward to a predetermined distance from the two corresponding sides of the bottom of said accommodating groove, and respective hooks being disposed in a mutually opposite direction at bottoms of said two rod bodies, such that said movable button is accommodated in the accommodating groove of said first board, so that the flange is exposed and protruded, and so that the hooks on the two rod bodies are exactly accommodated in said groove hole and another groove hole;
    a sliding member and another sliding member, capable of horizontally sliding into the space of said groove hole and said another groove hole, and a first embedding member being disposed respectively on a horizontal end of said sliding member and said another sliding member, and an embedding section respectively embedded with the hooks of said rod bodies at a position adjacent to the first embedding member; and a second embedding member disposed on a vertical sidewall of each of said sliding member and said another sliding member;
    a second board, having a size that exactly fits one of the surfaces of the first board;
    a stand, having a top and a hook each on both sides of the top, capable of sliding along the second longitudinal groove of the first board, and a pivotal connecting section respectively disposed in a middle of a surface of the stand, and an embedding groove disposed respectively at a predetermined gap between two sides of said pivotal connecting section; and
    a support rod, having one end coupled to said pivotal connecting section of said stand, and the other end coupled to said another accommodating groove in said first board.

2. The modular stand structure of claim 1, wherein said accommodating groove at both sides of the bottom of said accommodating groove comprises a groove respectively extending downward at a predetermined distance, a groove hole and another groove hole respectively connecting the bottom of said two grooves, a protruded pillar being disposed in the horizontal space of said groove hole and said another groove hole, and a hole each disposed on said sliding member and said another sliding member such that said holes sheath said sliding members onto said protruded pillars.

3. The modular stand structure of claim 2, wherein said two first longitudinal sliding grooves comprise a penetrating hole each at the bottom of the two corresponding grooves, such that said first embedding members are exposed from said penetrating hole, and another penetrating hole is disposed on a vertical sidewall of said two longitudinal grooves corresponding to said groove hole such that said second embedding member is exposed from said another penetrating hole.

4. The modular stand structure of claim 1, wherein said sliding member and said another sliding member respectively have another vertical sidewall and a first spring at said another vertical sidewall, said first spring respectively pressing against an inner wall of said groove hole and said another groove hole, such that after said sliding member and said another sliding member slide horizontally, said sliding members restore their original positions quickly.

5. The modular stand structure of claim 1, wherein said accommodating groove has a damper and a second spring therein, and the other end of said support rod is coupled to said damper and pressed by said second spring.

6. The modular stand structure of claim 1, wherein said first board comprises a contractible pad disposed between both sides of another top side of the first board, so that the first embedding is secured into two embedding grooves when said stand is stored, and said contractible pad comprises a third spring such that said stand is secured into a fixe position by elastic compression of said third spring in said contractible pad and pressing by a protruded pad disposed substantially in the middle of the surface of said stand.

7. The modular stand structure of claim 1, wherein said movable button comprises a rectangular hole thereon; a concave hole disposed correspondingly on said accommodating groove of said first board; and a fourth spring disposed between said rectangular hole and said concave hole, whereby said fourth spring strengthens automatic restoration of said movable button.

* * * * *